(12) United States Patent
Allen

(10) Patent No.: US 7,003,795 B2
(45) Date of Patent: Feb. 21, 2006

(54) WEBCAM-BASED INTERFACE FOR INITIATING TWO-WAY VIDEO COMMUNICATION

(75) Inventor: Paul G. Allen, Mercer Island, WA (US)

(73) Assignee: Digeo, Inc., Kirkland, WA (US)

( * ) Notice: Subject to any disclaimer, the term of this patent is extended or adjusted under 35 U.S.C. 154(b) by 903 days.

(21) Appl. No.: 09/892,160

(22) Filed: Jun. 26, 2001

(65) Prior Publication Data

US 2002/0196746 A1    Dec. 26, 2002

(51) Int. Cl.
*H04N 7/173* (2006.01)
*H04N 7/14* (2006.01)

(52) U.S. Cl. ............... 725/105; 709/231; 348/14.01

(58) Field of Classification Search ............... 725/105, 725/40, 41, 43, 37; 348/564, 588, 14.03, 348/14.07, 207.1; 709/231
See application file for complete search history.

(56) References Cited

U.S. PATENT DOCUMENTS

| | | | |
|---|---|---|---|
| 4,831,438 A | 5/1989 | Bellman, Jr. et al. ........ 358/108 |
| 5,382,972 A * | 1/1995 | Kannes ..................... 348/14.07 |
| 5,485,221 A * | 1/1996 | Banker et al. .............. 348/563 |
| 5,546,324 A | 8/1996 | Palmer et al. .............. 364/514 |
| 5,606,364 A | 2/1997 | Kim .......................... 348/159 |
| 5,764,277 A * | 6/1998 | Loui et al. ................ 348/14.01 |
| 5,877,821 A | 3/1999 | Newlin et al. .............. 348/724 |
| 5,914,747 A | 6/1999 | Hamilton ..................... 348/15 |
| 6,002,995 A * | 12/1999 | Suzuki et al. ................ 702/188 |
| 6,052,509 A | 4/2000 | Abe .......................... 386/117 |
| 6,128,649 A | 10/2000 | Smith et al. ................ 709/217 |
| 6,223,213 B1 | 4/2001 | Cleron et al. ............... 709/206 |
| 6,239,836 B1 | 5/2001 | Suzuki et al. ............... 348/211 |
| 6,243,129 B1 | 6/2001 | Deierling ..................... 348/15 |
| 6,366,311 B1 | 4/2002 | Monroe ...................... 348/148 |
| 6,510,553 B1 * | 1/2003 | Hazra ......................... 725/87 |
| 6,539,545 B1 | 3/2003 | Dureau et al. ................ 725/48 |
| 6,543,052 B1 | 4/2003 | Ogasawara ................... 725/60 |
| 6,564,380 B1 | 5/2003 | Murphy ....................... 725/86 |
| 6,741,276 B1 * | 5/2004 | Yonezawa et al. ........... 348/159 |
| 6,813,312 B1 * | 11/2004 | Tullberg et al. ....... 375/240.01 |
| 6,813,372 B1 * | 11/2004 | Standridge et al. ......... 382/107 |
| 2003/0197785 A1 * | 10/2003 | White et al. ........... 348/207.99 |

\* cited by examiner

*Primary Examiner*—Gims Philippe
*Assistant Examiner*—Erick Rekstad
(74) *Attorney, Agent, or Firm*—Kory D. Christensen; Stoel Rives LLP

(57) ABSTRACT

A plurality of user-selectable video streams are displayed on a first terminal, each video stream being generated by a video camera associated with a different terminal in a network. By selecting one of the displayed video streams, a user may establish two-way video communication between the first terminal and the terminal associated with the selected video stream.

57 Claims, 9 Drawing Sheets

WEBCAM-BASED INTERFACE FOR INITIATING TWO-WAY VIDEO COMMUNICATION

BACKGROUND OF THE INVENTION

1. Field of the Invention

The present invention relates generally to systems and methods for video communication. More specifically, the present invention relates to a webcam-based interface for initiating two-way video communication.

2. Description of Related Background Art

In recent years, a growing number of personal computers and interactive television systems are equipped with digital video cameras. Such cameras may be used for two-way video communication (videoconferencing) between systems connected by a communication network, such as a local area network (LAN) or the Internet.

Digital video cameras may also be used for one-way video communication. For example, a camera may be configured as a "web camera" or "webcam." A webcam captures a continual stream of video images and broadcasts the images via the Internet to any requesting Web browser. In the early days of the Internet, webcams were used to monitor coffee pots and fish tanks. Today, thousands of webcams are used in such diverse applications as monitoring freeway traffic (e.g., "traffic cams") and monitoring children at day care centers (e.g., "kiddie cams" or "cradle cams").

Current videoconferencing systems are deficient in a number of respects. For example, before a video connection is established, a user of one system cannot visually determine whether a user of another system is within the proximity of the camera and thus able to accept the video communication. Thus, many wasted communication attempts are made when a receiving party is not available.

Additionally, situations exist in which a user of one system may wish to monitor the output of a camera of another system before deciding whether to initiate video communication. For example, parents may wish to periodically monitor the activities of their children and only initiate communication when the necessity arises. Similarly, a child caring for an aging parent may wish to periodically monitor the parent's condition using a digital video camera, changing the one-way video monitoring into two-way video communication if their assistance is required.

Indeed, it would be desirable for an individual to be able to monitor the output of multiple cameras at different locations, e.g., day care, parent's home, etc., while being able to selectively establish two-way video communication with one of the locations. Current videoconferencing systems do not provide such a monitoring feature prior to the establishment of a video communication channel.

Using a videoconferencing system to create a permanent video communication channel between two systems may be undesirable for a number of reasons, including cost, privacy, and security. For example, parents monitoring their children from work may not wish their children to have a permanent window into their offices. Additionally, creating a two-way video communication channel is expensive in terms of communication bandwidth, limiting a videoconferencing system to only a few simultaneous connections.

Webcams provide a mechanism for one-way video monitoring of multiple video streams. Unfortunately, the one-way nature of webcams make them unsuited for video communication. No hybrid webcam-monitoring and videoconferencing system currently exists.

Accordingly, what is needed is a system and method for allowing a user of one system to visually determine whether a user of another system is available before attempting to establish two-way video communication between the systems. What is also needed is a system and method that allows the user of the first system to periodically monitor the output of a camera of the second system, while allowing a user to selectively establish a two-way video communication channel with the second system if desired. Indeed, what is needed is a system and method for converting a one-way video monitoring session into a two-way video communication session in response to a user selection of a displayed webcam.

BRIEF DESCRIPTION OF THE DRAWINGS

Non-exhaustive embodiments of the invention are described with reference to the figures, in which.

DETAILED DESCRIPTION OF THE PREFERRED EMBODIMENTS

Figure 1:
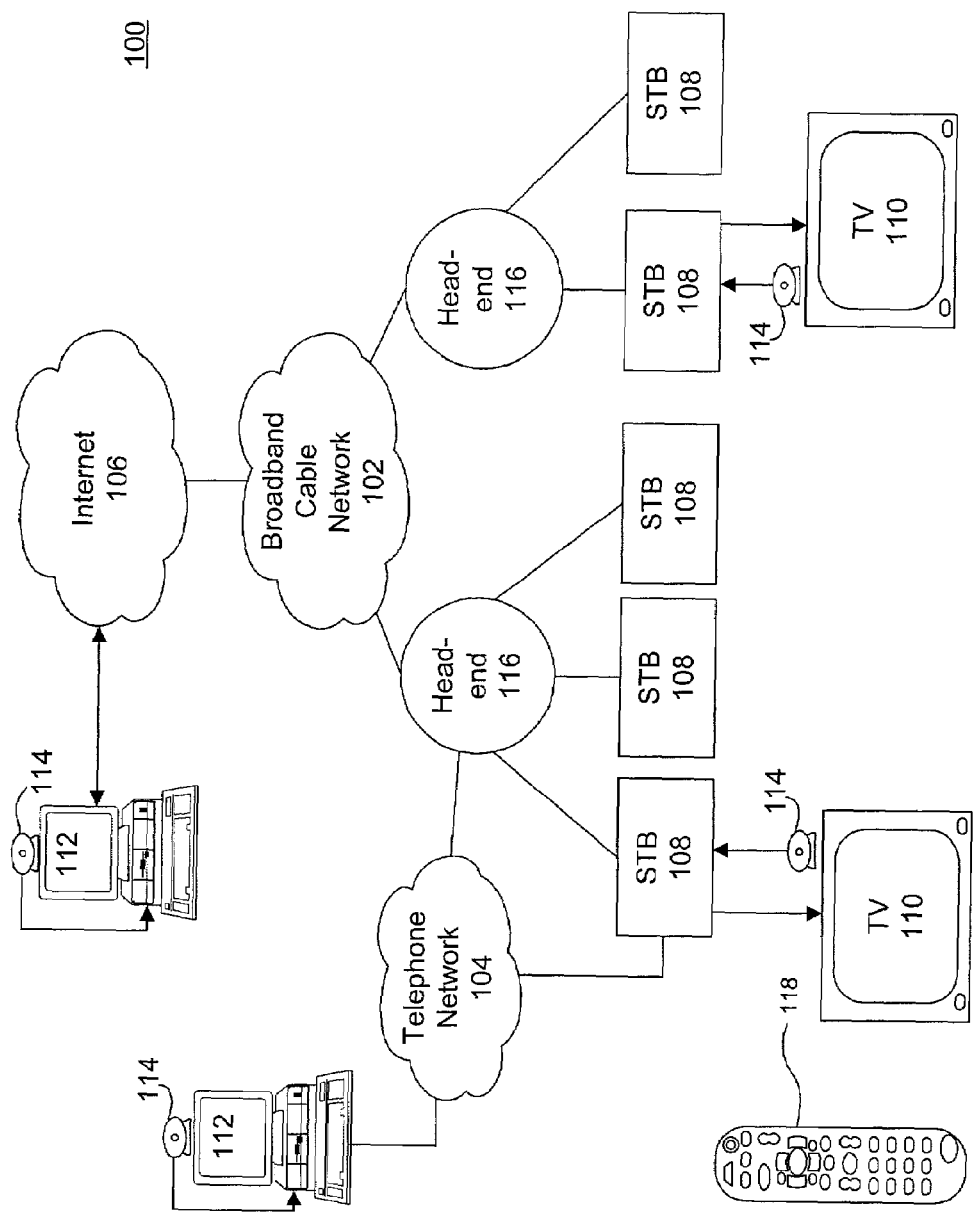
FIG. 1 is a block diagram of a system supporting one-way and two-way video communication.

The present invention solves the foregoing problems and disadvantages with a webcam-based interface for initiating two-way video communication. In one embodiment, a terminal receives and simultaneously displays a number of video streams. Each video stream may be generated by a camera associated with a different terminal in a network.

The video streams may be displayed on the terminal in various formats, such as a grid format or a ticker format. For instance, in the grid format, the video streams are arranged in rows and columns on the terminal's display screen. In the ticker format, the video streams move across the display screen in a carousel fashion (e.g., like a stock ticker). Any number of video streams may be displayed in either format, limited only by bandwidth considerations.

Preferably, a user may select one of the displayed video streams. In response to the user selection, a two-way video communication may be established between the terminal on which the video streams are displayed and a terminal from which the selected video stream originated.

Accordingly, a user of one system may visually determine whether a user of another system is available before attempting to establish two-way video communication between the systems. Additionally, a user of the first system may periodically monitor the output of a camera of the second system and selectively establish two-way video communication with the second system if desired. This is of particular utility to parents and other caregivers.

In one embodiment, the displayed video streams are cached within the receiving terminal such that the streams may be viewed at a subsequent time. Alternatively, the video streams may be cached within an intermediate network node, such as a cable head-end, or at the originating terminal. Thus, in one embodiment, a user may select one of the displayed video streams and request playback of an earlier-in-time segment of the video stream.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, user selections, network transactions, database queries, database structures, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Throughout the following disclosure, the term "coupled" may be used to refer to components that are either directly connected to one another or that are linked by one or more other components. Thus, as used herein, the term "coupled" may be synonymous with "in electrical communication with" or simply "in communication with."

Referring now to FIG. 1, there is shown system 100 supporting both one-way (e.g., webcam) and two-way video communication. In one implementation, the system 100 relies on a broadband cable network 102. However, other networks are contemplated, examples of which include a satellite network (not shown), a telephone network 104, or a packet-driven network, such as the Internet 106.

In one configuration, the system 100 includes a plurality of set top boxes (STBs) 108 located, for instance, at customer homes. Generally, an STB 108 is a consumer electronics device that serves as a gateway between a customer's television 110 and the network 102. In alternative embodiments, an STB 108 may be embodied more generally as a personal computer 112, an advanced television 110 with integrated STB functionality, or another type of client terminal.

An STB 108 receives encoded video signals and other information from the network 102 and decodes the same for display on the television 110 or other display device (such as a computer monitor, flat panel display, or the like). As its name implies, an STB 108 is typically located on top of, or in close proximity to, a television 110.

An STB 108 may be coupled to a video camera 114, which captures video information for the STB 108. The video camera 114 may be embodied as digital video camera having a charge-coupled device (CCD) array. Digital video cameras are well known in the art, such as the Logitech QuickCam Pro USB®, available from Logitech, Inc. of Fremont, Calif.

The video camera 114 may be used for both one-way and two-way video communication. For example, the video camera 114 may be configured as a "webcam", which captures a continual stream of video images and broadcasts the images via a communication network, such as the Internet 106, to a requesting client module, such as a Web browser. However, the term "webcam" should not be construed as being limited only to the World Wide Web component of the Internet.

In certain embodiments, the video camera 114 may include an integrated microphone (not shown) for capturing audio signals. Alternatively, the microphone may be integrated with the STB 108, the remote control 118, the television 110, or the like.

The following discussion refers primarily to the capture and transmission of video signals. However, those skilled in the art recognize that the term "videoconferencing" also implies the capture and transmission of audio signals. Thus, where video signals and video components are specifically illustrated, audio signals and audio components are implied.

As discussed in further detail below, the STB 108 may convert video signals generated by the video camera 114 into various formats for transmission through the network 102. The STB 108 may transmit video streams to one or more other STBs 108, to a personal computer 112, or to another type of terminal.

In one embodiment, each STB 108 is coupled to the network 102 via a head-end 116 or other intermediate network node. In the context of a cable network, a head-end 116 is a centrally-located facility where television programs are received from a local cable TV satellite downlink or other source and packaged together for transmission to customer homes. In one configuration, a head-end 116 also functions as a Central Office (CO) in the telephone industry, routing video streams and other data to and from the various STBs 108 serviced thereby.

Head-ends 116 may be coupled directly to one another or through the network 102. In some cases, head-ends 116 may be connected via a separate network, one particular example of which is the Internet 106. Two or more STBs 108 may also be served by the same head-end 116.

Transmission between head-ends 116 may occur, for example, (i) via a direct peer-to-peer connection between head-ends 116, (ii) upstream from a first head-end 116 to broadband communication network 102 and then downstream to a second head-end 116, (iii) via the Internet 106, or (iv) via a telephone network 104. For example, a first STB 108 may send a video transmission upstream to a first head-end 116, then to a second head-end 116, and finally downstream to a second STB 108.

In one configuration, video streams are distributed in an encoded format, such as MPEG (Moving Picture Experts Group) or Video over IP (VoIP). Various MPEG standards are known, such as MPEG-2, MPEG-4, MPEG-7, and the like. Thus, the term "MPEG," as used herein, contemplates all MPEG standards. Moreover, other video encoding/compression standards exist other than MPEG, such as JPEG, JPEG-LS, H.261, and H.263. Accordingly, the invention should not be construed as being limited only to MPEG. Of course, proprietary video encoding formats may be used within the scope of the invention.

Each STB 108 may be distinguished from other network components by a unique identifier, number, code, or address, examples of which include an IP (Internet Protocol) address or a MAC (Media Access Control) address. Thus, video streams and other information may be transmitted from the network 102 to a specific STB 108 by specifying the corresponding address, after which the network 102 routes the transmission to its destination using conventional techniques.

The network 102 is also preferably coupled to the Internet 106 to provide access thereto by the STBs 108. The Internet 106 is a "network of networks" and is well known to those skilled in the art. Communication over the Internet 106 is accomplished using standard protocols, such as TCP/IP (transmission control protocol/Internet protocol) and the like.

A remote control 118 is provided, in one configuration, for convenient remote operation of the STB 108 and the television 110. The remote control 118 may use infrared (IR), radio frequency (RF), or other wireless technologies to transmit control signals to the STB 108 and the television 110. Other remote control devices are also contemplated, such as a wired or wireless mouse (not shown), a keyboard (not shown), or the like.

Figure 2:
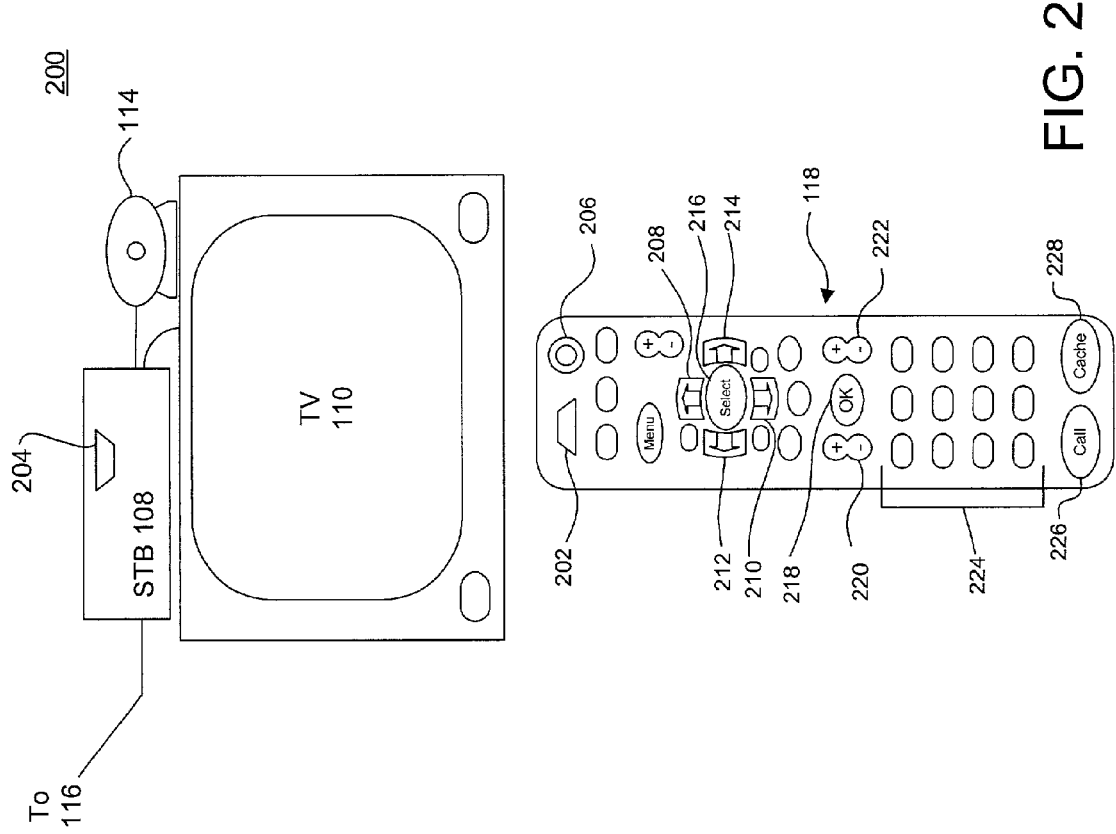
FIG. 2 is an illustration of an interactive television system including a remote control, a camera, a set top box, and a television.

FIG. 2 is an illustration of an interactive television system 200, including a remote control 118, a camera 114, a set top box 108, and a television 110 (or other display device). As noted, the remote control 118 is provided for convenient remote operation of the STB 108 and television 110. Preferably, control signals are transmitted from a wireless transmitter 202 in the remote control 118 to a wireless receiver 204 in the STB 108 and/or the television 110.

In the depicted embodiment, the remote control 118 includes a plurality of buttons or similar controls. For instance, the remote control 118 may include a power button 206, an up arrow button 208, a down arrow button 210, a left arrow button 212, a right arrow button 214, a "Select" button 216, an "OK" button 218, channel adjustment buttons 220, volume adjustment buttons 222, alphanumeric buttons 224, a "Call" button 226, and an "Cache" button 228. The functions of certain of the above-identified buttons will be discussed in greater detail below.

While the following description refers primarily to a broadband cable network 102, the invention is not limited in this respect. A satellite delivery system may also be used, such as direct broadcast satellite (DBS) system. A DBS system may include a small 18-inch satellite dish (which is an antenna for receiving a satellite broadcast signal); a digital integrated receiver/decoder (IRD), which separates each channel and decompresses and translates the digital signal for display by a television; and a remote control.

Programming for a DBS system may be distributed, for example, by multiple high-power satellites in geosynchronous orbit, each with multiple transponders. Compression (e.g., MPEG) is used to increase the amount of programming that can be transmitted in the available bandwidth.

A digital broadcast center may be used to gather programming content, ensure its digital quality, and transmit the signal up to the satellites. Programming may come to the broadcast center from content providers (TBS, HBO, CNN, ESPN, etc.) via satellite, fiber optic cable and/or special digital tape. Satellite-delivered programming is typically immediately digitized, encrypted and uplinked to the orbiting satellites. The satellites retransmit the signal to every earth-station—or, in other words, every compatible DBS system receiver dish at customers' homes and businesses.

Some programs may be recorded on digital videotape in the broadcast center to be broadcast later. Before any recorded programs are viewed by customers, technicians may use post-production equipment to view and analyze each tape to ensure audio and video quality. Tapes may then be loaded into a robotic tape handling systems, and playback may be triggered by a computerized signal sent from a broadcast automation system. Back-up videotape playback equipment may ensure uninterrupted transmission at all times.

While the following description makes particular reference to cable head-ends 116, it should be recognized that satellite broadcast centers may be used for the same purpose. Thus, as used herein, the term "broadcast center" may refer interchangeably to head-ends 116 or satellite broadcast centers.

Figure 3:
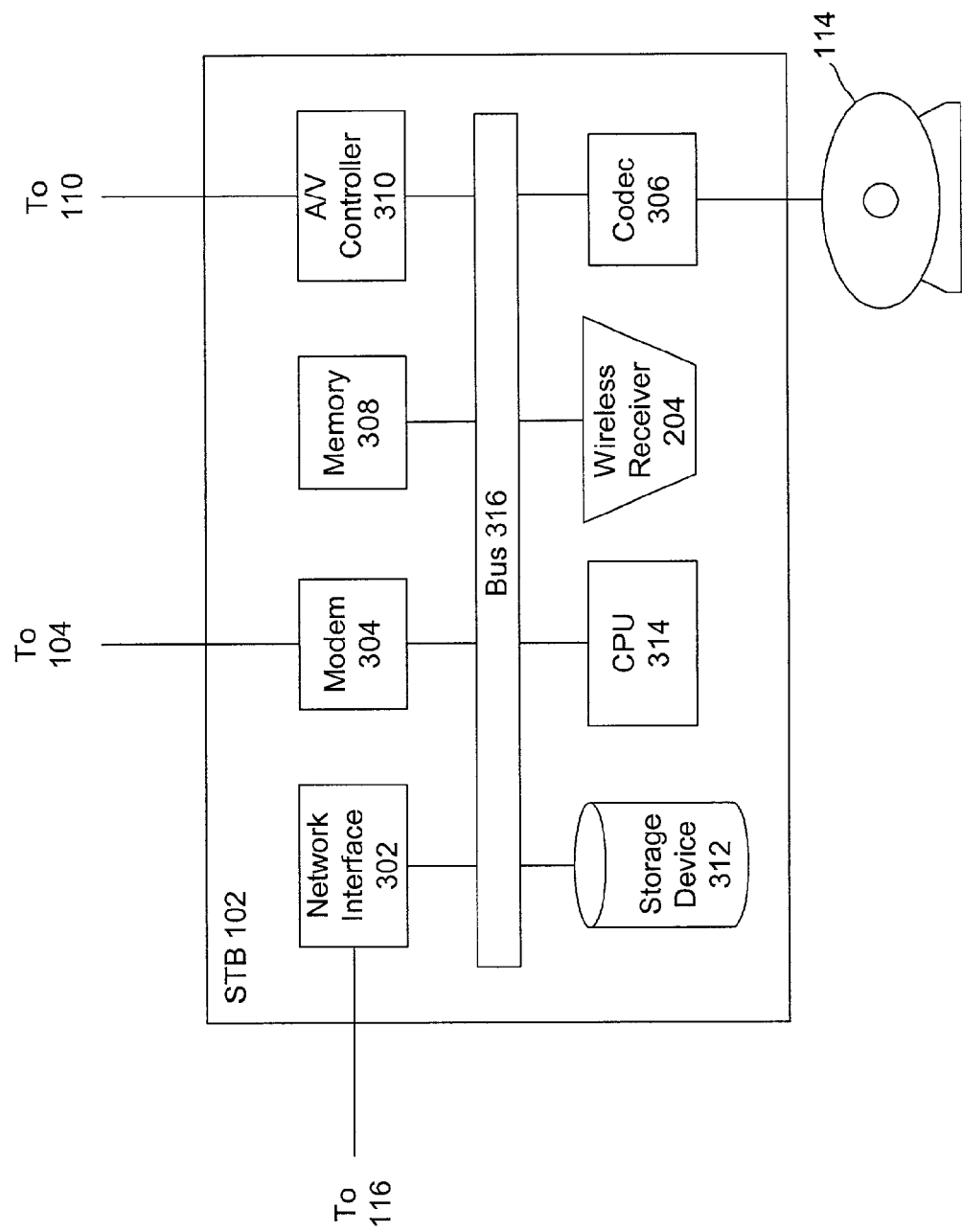
FIG. 3 is a block diagram of physical components of a set top box.

FIG. 3 is a block diagram of physical components a set top box 108 according to an embodiment of the invention. The STB 108 may include, in one configuration, a network interface 302 for communicating with the broadband communication network 102 via the head-end 116. The interface 302 may include conventional tuning circuitry for receiving MPEG (Moving Picture Experts Group) packets for a selected television channel. The interface 302 may also include conventional cable modem circuitry for sending or receiving other types of data. For example, the interface 302 may conform to the DOCSIS (Data Over Cable Service Interface Specification) or DAVIC (Digital Audio-Visual Council) cable modem standards.

In one configuration, one or more frequency bands (for example, from 5 to 30 MHz) may be reserved for upstream transmission. Digital modulation (for example, quadrature amplitude modulation or vestigial sideband modulation) may be used to send digital signals in an upstream transmission.

Of course, upstream transmission may be accomplished differently for different networks. Alternative ways to accomplish upstream transmission include using back channel transmission, which is typically sent via an analog telephone line, ISDN, DSL, or other techniques. For example, in one embodiment, communication with a telephone network 104 may also be accomplished via a separate telephone modem 304, such as a DSL (digital subscriber line) or analog telephone modem.

The STB 108 also preferably includes a CODEC (encoder/decoder) 306. The CODEC 306 serves to encode signals (such as audio/video signals) into a network-compatible data stream for transmission over the network 102. The CODEC 306 also serves to decode a network-compatible data stream received from the network 102. As depicted, the CODEC 306 may be implemented as a hardware component. Alternatively, or in addition, software encoding and decoding may be used. The CODEC 306 may use various algorithms, such as MPEG, for encoding and decoding. The CODEC 306 may be directly or indirectly coupled to the video camera 114 in order to encode a captured video signal.

The STB 108 may further include a memory device 308, such as a random access memory (RAM), to store data for temporary use. Similarly, a read-only memory (ROM) may be provided for storing more permanent data, such as fixed code and configuration information.

In one implementation, an audio/video (A/V) controller 310 is provided for converting decoded digital audio/video information into analog or digital signals for display/playback on the television 110 or other display devices. The A/V controller 310 may be implemented using one or more physical devices, such as separate graphics and audio interfaces. Preferably, the A/V controller 310 includes graphics hardware for performing bit-block transfers (bit-blits) and other graphical operations.

The STB 108 may also include a storage device 312, such as a hard disk drive, or the like. The storage device 312 may record encoded television broadcasts and retrieve the broadcasts at a later time for decoding by the CODEC 306 and display by the A/V controller 310. Thus, the storage device 312 may be used in PVR (personal video recording) applications, such as time shifting, pausing (buffering) live video, etc.

The storage device 312 may also be used, in various embodiments, to store viewer preferences, parental lock settings, electronic programming guide (EPG) data, programming preferences, passwords, e-mail messages, and the like. In one implementation, the storage device 312 also stores an operating system (OS) for the STB 108, such as Windows CE® or Linux®.

As previously noted, the STB 108 may include a wireless receiver 204 for receiving control signals from the wireless transmitter 202 of the remote control 118. The wireless transmitter 202 may rely on various wireless technologies, such as IR or RF.

A CPU 314 controls the operation of the STB 108, including the other components thereof, which are coupled to the CPU 314 via a bus 316. The bus 316 serves a communication channel between many components (e.g., CPU 314, Interface 302, storage device 312) of the STB 108. The CPU 314 may be embodied as a microprocessor, a microcontroller, a digital signal processor (DSP) or other device known in the art. For example, the CPU 314 may be embodied as an Intel® x86 microprocessor. The CPU 314 may perform various logical and arithmetic operations in response to control signals generated by the remote control 118.

Of course, FIG. 3 illustrates only one possible configuration of an STB 108. Those skilled in the art will recognize that various other architectures and components may be provided within the scope of the invention. In addition, various standard components of typical STB 108 are not illustrated in order to avoid obscuring aspects of the invention.

Figure 4:
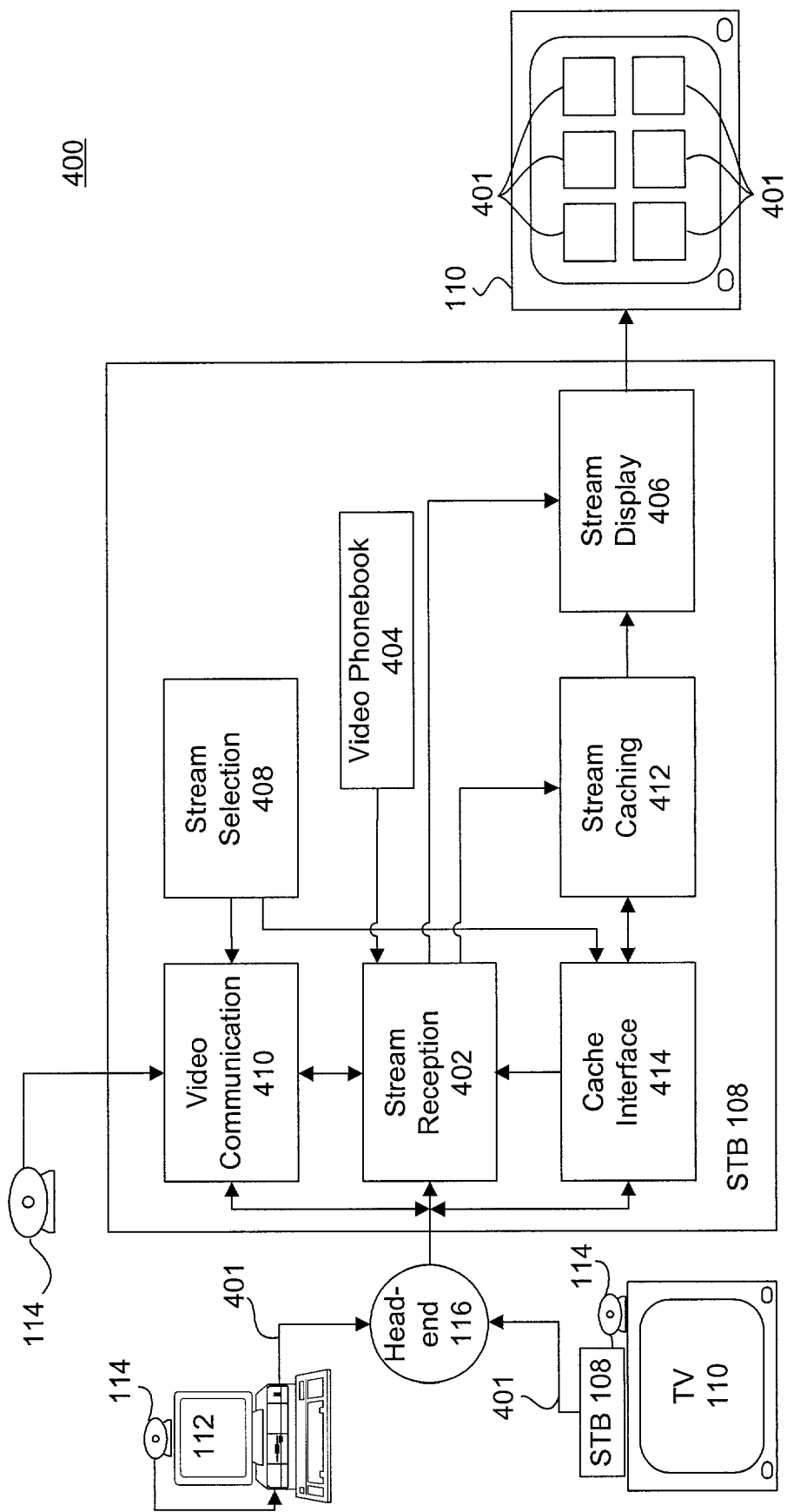
FIG. 4 is a block diagram of logical components of a system for providing a webcam-based interface for initiating two-way video communication.

FIG. 4 is a block diagram of logical components of system 400 for providing a webcam-based interface for initiating two-way video communication. The depicted logical components may be implemented using one or more of the physical components shown in FIG. 3. Additionally, or in the alternative, various logical components may be implemented as software modules stored in the memory 308 and/or storage device 312 and executed by the CPU 314. Those skilled in the art will recognize that various illustrated components may be combined together or integrated with standard components in various configurations without departing from the scope or spirit of the invention.

As shown in FIG. 4, a plurality of video streams 401 are generated by video cameras 114 coupled to terminals within a network. The terminals may be embodied as STBs 108, personal computers 112, or the like. As depicted, the network may be embodied as a cable network, which includes a plurality of head-ends 116. Of course, other terminals, networks, and network architectures may be used within the scope of the invention.

In one embodiment, the STB 108 includes a stream reception component 402, which receives the plurality of video streams 401 from a head-end 116 or other intermediate network node. As noted above, the video cameras 114 may be configured as webcams, which include hardware and software for providing continuous, one-way video streams 401 to any requesting client module, such as a Web browser. In such an embodiment, the stream reception component 402 may be embodied as the component of a Web browser that is responsible for receiving and processing video streams 401 received from webcams. However, the stream reception component 402 need not be implemented in the context of a Web browser.

The particular video streams 401 received by the stream reception module 402 are preferably user selected. For example, the user may specify a network address of each camera-equipped terminal for which a video stream 401 is desired. The stream reception component 402 then interacts with the selected terminal to establish a one-way video communication channel. Various standard protocols may be used, well known to those skilled in the art.

In certain embodiments, the selection of video streams 401 may be dictated by a user's video phonebook 404, which may list the network addresses of various terminals with which the user regularly establishes video communication. A user interface (not shown) may be provided for allowing a user to select terminals from the videophone book 404 from which to receive video streams 401. Of course, security protocols may be provided to limit a user's access to terminals and video cameras 114 from which the user is authorized to receive video streams 401.

In one embodiment, the STB 108 also includes a stream display component 406, which simultaneously displays the video streams 401 (or a subset thereof) on a display device, such as a television 110. As explained in greater detail below, the stream display component 406 may arrange the video streams 401 in different formats, such as a grid format or a ticker format. The stream display component 406 may be implemented, in certain embodiments, as the component of a Web browser responsible for displaying video streams 401 received from multiple webcams.

In one configuration, the video streams 401 are "live", e.g., not recorded and subsequently broadcast at a later time. However, live video streams 401 may be received by the stream reception component 402 after a delay due to network latency and other factors. Thus, the term "live" should not be confused with "real time".

In certain embodiments, the video streams 401 are not live, but include pre-recorded information. For example, when a video camera 114 for a terminal is not active, a pre-recorded video stream 401 may be transmitted. The pre-recorded video stream 401 may include moving or static images. Alternatively, an STB 108 may store pre-recorded video streams or images to display in the event that a video camera 114 is not active. For example, the STB 108 may store a picture of a user associated with a particular webcam, which is displayed when the user's webcam is not transmitted live video.

The STB 108 may further include a stream selection component 408 which allows the user to select one of the displayed video streams 401. As described in more detail below, the stream selection component 408 may allow a user to select a video stream 401 by moving a selection outline (not shown) around a desired stream and pressing an appropriate button on the remote control 118, such as the "Call" button 226 or the "Cache" button 228 (illustrated in FIG. 2).

The STB 108 may further include a video communication component 410 in communication with the stream selection component 408. In one embodiment, when a user selects a video stream 401 and presses the "Call" button 226 (or other suitable control), the video communication component 410 establishes two-way video communication between the user's terminal (e.g., STB 108) and the terminal from which the selected video stream 401 originated. Systems for two-way video communication using video cameras 114 are known, such as Microsoft Netmeeting®, CUseeMe®, or the like. As illustrated in FIG. 1, the two-way video communication may be facilitated by various networks, such as such as broadband communication network 102, a telephone network 104, or the Internet 106.

Providing a video communication component 410 in communication with the stream reception and selection components 402, 408 allows a one-way (e.g., webcam) video communication channel to be converted into a two-way video communication channel. This is advantageous in that a user of the STB 108 may visually determine whether a user of another system is available before attempting to establish two-way video communication. Additionally, the user of the STB 108 may periodically monitor the camera output of the other system and selectively establish two-way video communication with that system if desired.

In certain embodiments, the STB 108 further includes a stream caching component 412. The stream caching component 412 may cache the plurality of video streams 401 (or selected ones) for a period of time. The video streams 401 may be cached, for example, within the storage device 312 of the STB 108. In one implementation, the stream caching component 412 caches the plurality of video streams for a pre-determined time period, which may be hardwired or user selected. Alternatively, the caching period may be limited by the storage space available within the storage device 312.

In one embodiment, after a user selects a video stream 401 and presses the "Cache" button 228 (or other suitable control), the stream caching component 412 retrieves a cached, earlier-in-time segment of the selected video stream 401 and provides the same to the stream display component 406 for display. For example, the stream caching component 412 may retrieve a cached copy of the last five minutes of a selected video stream 401, which is then displayed on the television 110 by the stream display 406 component.

The cached segment may be displayed by the stream display component 406 in forward or reverse direction. For example, playback of the cached segment may commence at the end of the cached segment (which may correspond to the time at which the "Cache" button 228 was pressed) and proceed in reverse direction to the start of the cached segment. Alternatively, playback may begin at the start of the cached segment and proceed to the end thereof.

In certain embodiments, the video streams 401 are not cached locally within the receiving STB 108. Rather, the video streams 401 are cached within another computer, possibly within the head-end 116, or another suitable location. Centralized caching of video streams 401 may be advantageous where a plurality of users are receiving the same video streams 401. Thus, separate copies of the video steams 401 need not be stored within each STB 108. In other embodiments, the video streams 401 are cached within the terminal from which the video streams 401 originated.

In such embodiments, a cache interface 414 is provided to communicate with the head-end 116 or other remote caching location to retrieve the cached video stream 401. The cache interface 414 may also be used to send video streams 401 captured by the local camera 114 associated with an STB 108.

Figure 5:
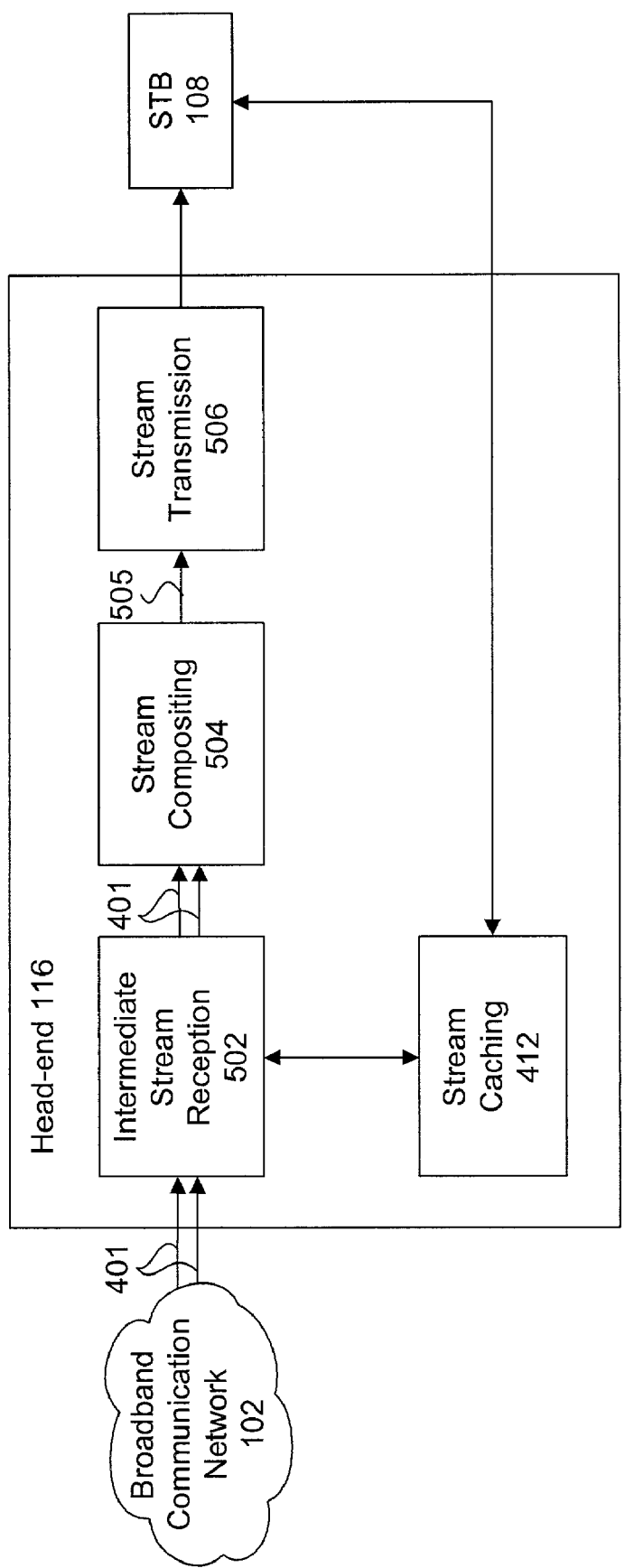
FIG. 5 is a block diagram of an system for video stream compositing implemented within a cable head-end.

In the above-described embodiments, several individual video streams 401 are received by the STB 108. In an alternative embodiment, as shown in FIG. 5, a stream reception component 502 within a head-end 116 or other intermediate network node may receive the individual video streams 401. Thereafter, a stream compositing component 504 combines the multiple video streams 401 into a single, composite video stream 505. A stream transmission component 506 then transmits the composite video stream 505 to the STB 108, where it is displayed as described above.

From the user's perspective, the display of the composite video stream 505 may be identical to the embodiment in which individual video streams 401 are received by the STB 108. For example, an individual video "stream" may still be selected within the composite video stream 505 in order to establish two-way video communication with a corresponding remote terminal or to access a cached video segment. However, from the perspective of the STB 108, receiving a single composite stream 505 generally reduces the processing requirements of the CPU 314. Thus, the STB 108 may be manufactured with lower cost components.

As previously noted, the head-end 116 may include a stream caching component 412 for centrally caching video streams 401 for a plurality of users. Segments of the cached video streams 401 may then be retrieved by individual STBs 108 for display.

Figure 6:
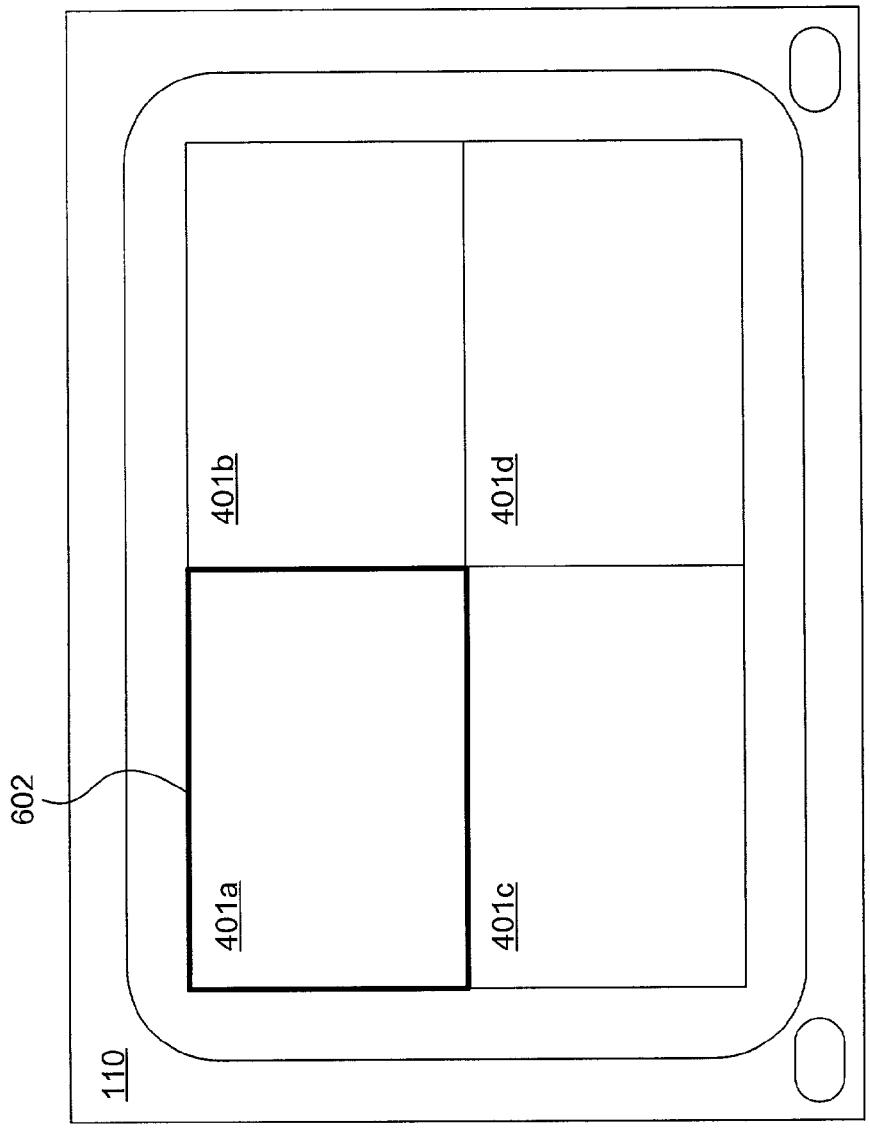
FIG. 6 illustrates a plurality of video streams displayed in a grid format.
Figure 6:
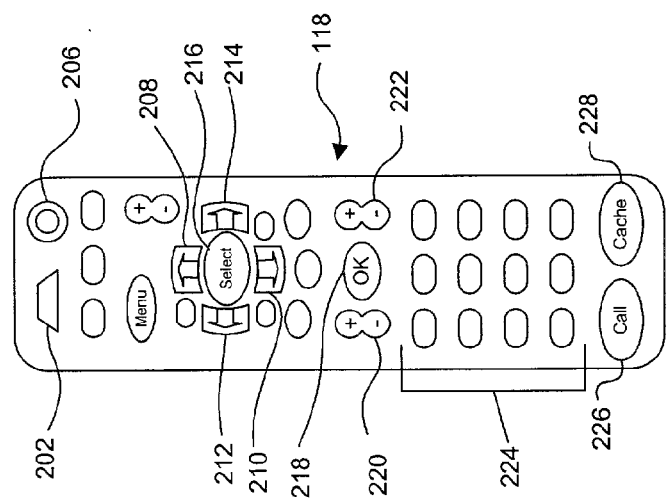

FIG. 6 illustrates a plurality of video streams 401a–401d being displayed on a television 110. As noted, the video streams 401a–401d may be displayed in various configurations, such as a grid configuration, in which the individual video streams 401a–401d are arranged in rows and columns. Of course, a single row or column are within the scope of the invention.

Preferably, the video streams 401a–401d are selectable. In one embodiment, a user may select, for example, video stream 401a by moving a selection outline 602 around the video stream 401a. In alternative embodiments, a pointer (not shown) or other selection mechanism could be used. The selection outline 602 is moved, in one embodiment, by means of navigation buttons on the remote control 118, such as the up, down, left, and right buttons 208, 210, 212, 214. In other embodiments, a mouse, trackball, or other pointing device could be used for the same purpose.

Figure 7:
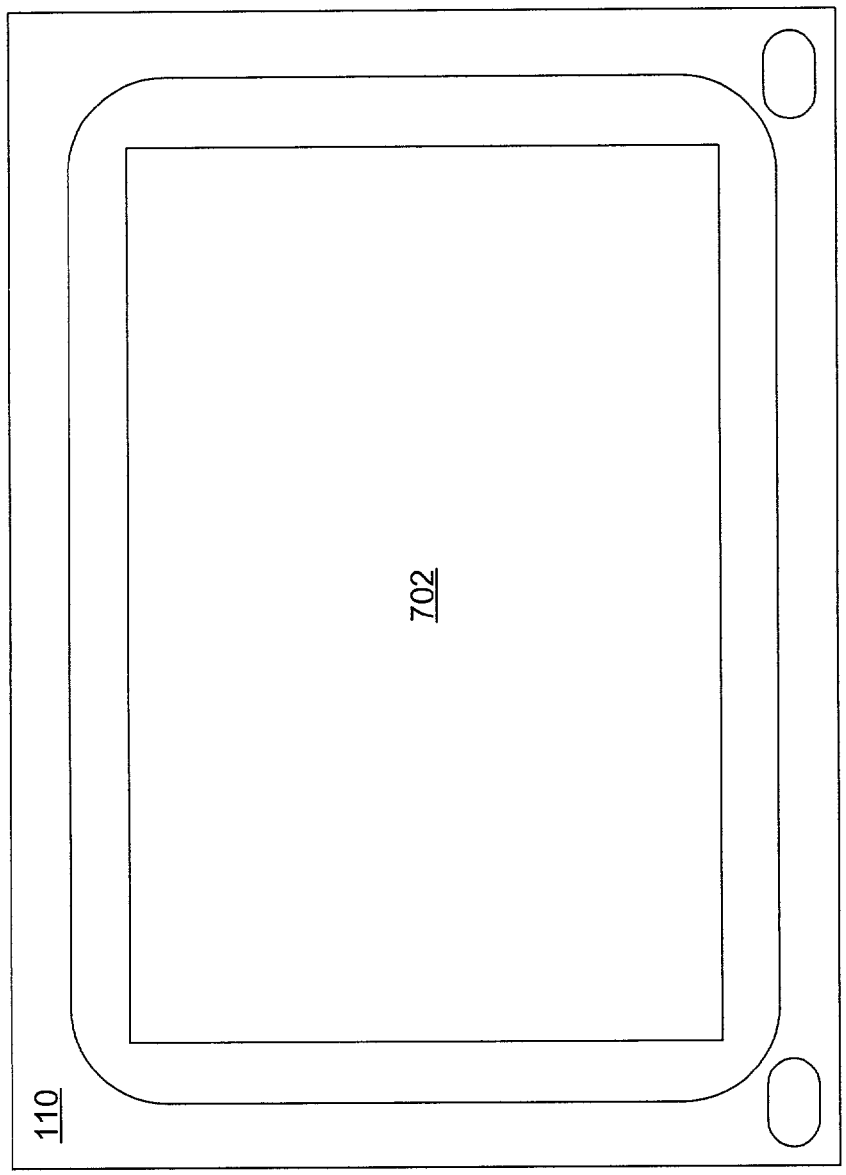
FIG. 7 illustrates a video communication window.

In response to the user pressing the "Call" or "Cache" buttons 226, 228, the plurality of video streams 401 may be replaced, in one embodiment, by a single, enlarged video communication window 702, as shown in FIG. 7. The video communication window 702 may be used for two-way video communication (in conjunction with the video communication module 410) or for displaying cached video stream segments (by means of with the stream caching module 412).

Figure 8:
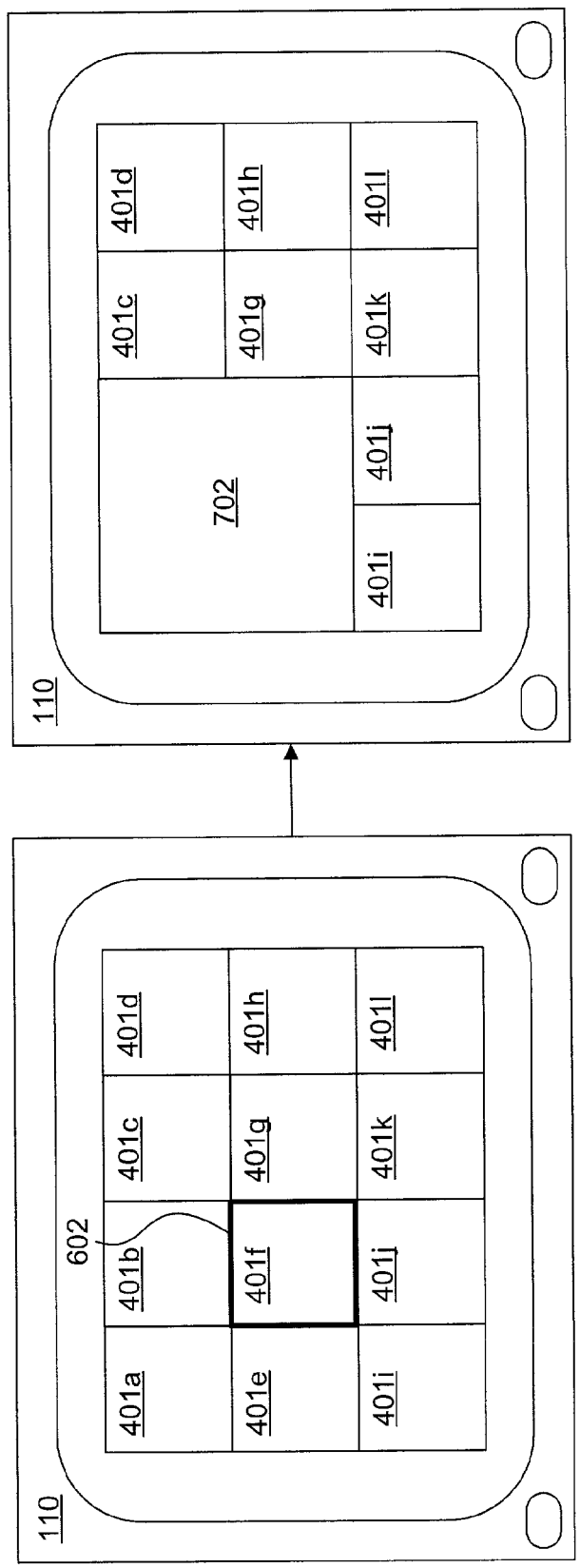
FIG. 8 illustrates a video communication window displayed with a plurality of video streams.

As shown in FIG. 8, the video communication window 702 need not replace all of the displayed video streams 401. This allows the user to continue to monitor other video streams 401 while engaging in two-way video communication or while watching cached video stream segments. In certain embodiments, none of the video streams 401 are replaced by the video communication window 702, but are simply reduced in size proportionately to fill the area not used by the video communication window 702.

Figure 9:
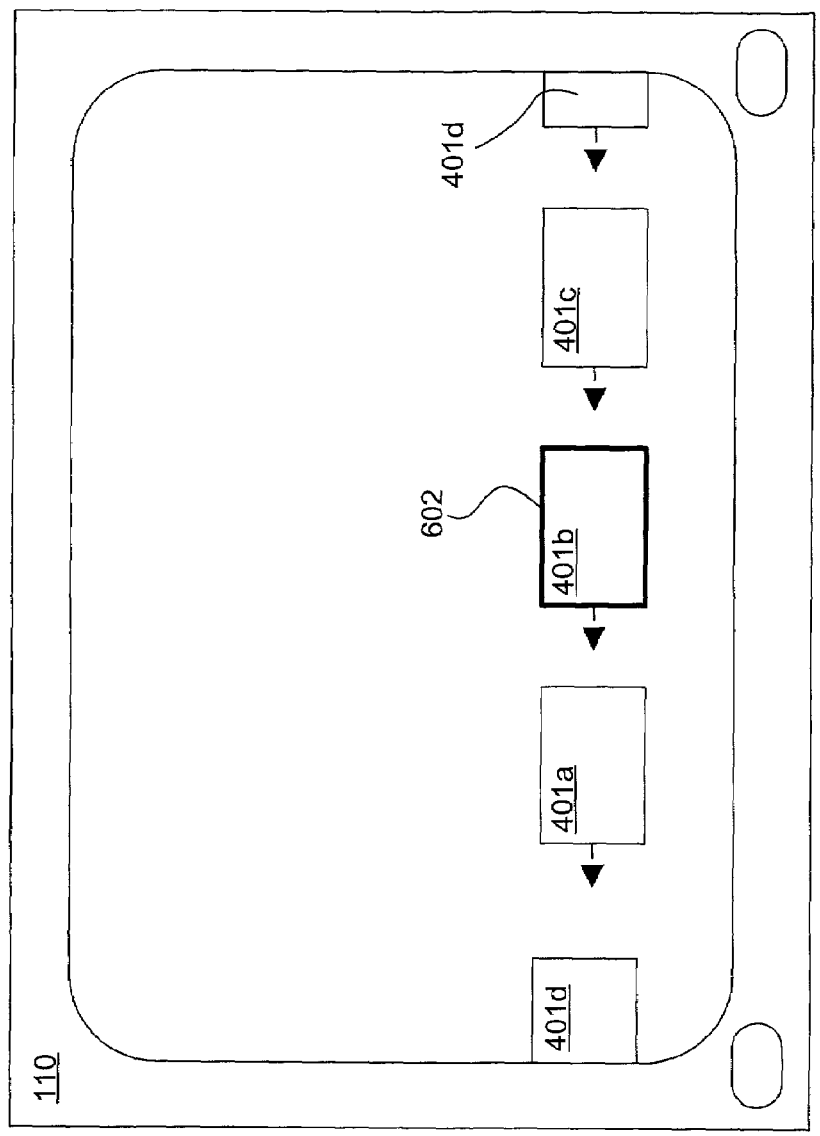
FIG. 9 illustrates a plurality of video streams displayed in a ticker format.

In an alternative embodiment, as shown in FIG. 9, a plurality of video streams 401a–401d may be displayed in a ticker format. In one configuration, the displayed video streams 401a–401d move across the television 110 from right to left in a carousel fashion. For example, when the video stream 401d passes beyond the left hand side of the television 110, it reappears on the right hand side.

Of course, the ticker format may be configured in various different ways without departing from the spirit and scope of the invention. For example, the video streams 401 may move in any direction. Moreover, more than one row or column of video streams 401 may move across the screen simultaneously.

As in the case of the grid format, a user may select a video stream by controlling a selection outline 602, pointer, or other selection mechanism. Once a selection has been confirmed (e.g., using the "Call" button 226 or the "Cache" button 228), a video communication window 702 (not shown) may be displayed, as previously described.

Based on the foregoing, the present invention offers numerous advantages over conventional systems. In particular, a user may monitor video streams 401 from multiple cameras 114 at a single location. Thereafter, by selecting one of the video streams 401, a user may establish two-way video communication with the terminal associated with the selected video stream 401. Alternatively, the user may retrieve and display cached video footage from an earlier-in-time segment of the selected video stream 401.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for establishing two-way video communication between a plurality of terminals connected by a network, the method comprising:
   receiving at a first terminal a plurality of video streams, each video stream being generated by a video camera associated with a different terminal;
   simultaneously displaying the plurality of video streams on the first terminal, wherein the plurality of video streams are arranged in a ticker format;
   detecting a user selection of one of the video streams being displayed; and
   establishing two-way video communication between the first terminal and the terminal associated with the selected video stream.

2. The method of claim 1, wherein at least one video stream comprises a live video stream generated by a webcam.

3. The method of claim 1, wherein at least one video stream comprises a pre-recorded video stream in response to the video camera associated with the selected video stream being currently inactive.

4. The method of claim 1, wherein displaying comprises:
   arranging the plurality of video streams in a grid format on the first terminal.

5. The method of claim 1, further comprising:
   moving the video streams in a same direction across at least a portion of a display screen of the first terminal.

6. The method of claim 1, wherein at least one terminal comprises an interactive television system.

7. The method of claim 1, wherein receiving comprises:
   selectively receiving video streams corresponding to entries in a video phonebook.

8. The method of claim 1, wherein detecting comprises:
   moving a selection outline around a displayed video stream in response to user activation of navigational buttons on a remote control device; and
   detecting user activation of a specifically-designated button on the remote control device for establishing two-way video communication.

9. The method of claim 1, wherein establishing comprises:
   displaying a video communication window on the first terminal;
   capturing a first video stream using a video camera associated with the first terminal;
   transmitting the first video stream to the second terminal for display thereon;
   receiving a second video stream from the second terminal; and
   displaying the second video stream in the video communication window on the first terminal.

10. The method of claim 9, further comprising:
    enlarging the selected video stream as displayed on the first terminal relative to the non-selected video streams, wherein the enlarged video stream comprises the video communication window.

11. The method of claim 1, further comprising:
    caching at least one video stream generated by a video camera.

12. The method of claim 11, wherein the at least one video stream is cached at a location selected from the group consisting of the terminal from which the video stream originated, the first terminal, a satellite broadcast center, and a cable head-end.

13. The method of claim 11, further comprising:
    detecting a user selection of one of the video streams being displayed;
    retrieving a cached copy of an earlier-in-time segment of the selected video stream; and
    displaying the cached copy of the earlier-in-time segment on the first terminal.

14. A method for establishing two-way video communication between a plurality of terminals connected by a network, the method comprising:
    receiving at an intermediate network node a plurality of video streams, each video stream being generated by a video camera associated with a different terminal;
    combining the plurality of video streams into a composite video stream;
    sending the composite video stream to a first terminal for display thereon, wherein the plurality of video streams within the composite video stream are arranged in a ticker format;
    detecting a user selection of one of the plurality of video streams being displayed within the composite video stream; and
    establishing two-way video communication between the first terminal and the terminal associated with the selected video stream.

15. The method of claim 14, wherein the intermediate network node comprises a cable head-end.

16. The method of claim 14, wherein the intermediate network node comprises a satellite broadcast center.

17. A method for establishing two-way video communication between a plurality of terminals connected by a network, the method comprising:
    receiving at a first terminal a plurality of video streams, each video stream being associated with a different terminal;
    simultaneously displaying the plurality of video streams on the first terminal, wherein the plurality of video streams are arranged in a ticker format;
    detecting a user selection of one of the video streams being displayed;
    establishing a two-way video communication channel between the first terminal and a second terminal associated with the selected video stream;
    displaying a video communication window on the first terminal;
    capturing a first video stream using a video camera associated with the first terminal;

transmitting the first video stream to the second terminal for display thereon;

receiving a second video stream from the second terminal; and displaying the second video stream in the video communication window on the first terminal.

18. The method of claim 17, wherein at least one video stream comprises a live video stream generated by a webcam.

19. A method for establishing two-way video communication between a plurality of interactive television systems connected by a network, the method comprising:

receiving at a first interactive television system a plurality of video streams, each video stream being generated by webcam associated with a different interactive television system;

simultaneously displaying the plurality of video streams on the first interactive television system, wherein the plurality of video streams are arranged in a ticker format;

detecting a user selection of one of the video streams being displayed; and establishing two-way video communication between the first interactive television system and the interactive televisions system associated with the selected video stream.

20. A computer program product comprising program code for performing a method for establishing two-way video communication between a plurality of terminals connected by a network, the method comprising:

receiving at a first terminal a plurality of video streams, each video stream being generated by a video camera associated with a different terminal;

simultaneously displaying the plurality of video streams on the first terminal, wherein the plurality of video streams are arranged in a ticker format;

detecting a user selection of one of the video streams being displayed; and establishing two-way video communication between the first terminal and the terminal associated with the selected video stream.

21. The computer program product of claim 20, wherein at least one video stream comprises a live video stream generated by a webcam.

22. The computer program product of claim 20, wherein at least one video stream comprises a pre-recorded video stream in response to the video camera associated with the selected video stream being currently inactive.

23. The computer program product of claim 20, wherein displaying comprises:

arranging the plurality of video streams in a grid format on the first terminal.

24. The computer program product of claim 20, the method further comprising:

moving the video streams in a same direction across at least a portion of a display screen of the first terminal.

25. The computer program product of claim 20, wherein at least one terminal comprises an interactive television system.

26. The computer program product of claim 20, wherein receiving comprises:

selectively receiving video streams corresponding to entries in a video phonebook.

27. The computer program product of claim 20, wherein detecting comprises:

moving a selection outline around a displayed video stream in response to user activation of navigational buttons on a remote control device; and detecting user activation of a specifically-designated button on the remote control device for establishing two-way video communication.

28. The computer program product of claim 20, wherein establishing comprises:

displaying a video communication window on the first terminal;

capturing a first video stream using a video camera associated with the first terminal;

transmitting the first video stream to the second terminal for display thereon;

receiving a second video stream from the second terminal; and displaying the second video stream in the video communication window on the first terminal.

29. The computer program product of claim 28, the method further comprising:

enlarging the selected video stream as displayed on the first terminal relative to the non-selected video streams, wherein the enlarged video stream comprises the video communication window.

30. The computer program product of claim 20, the method further comprising:

caching at least one video stream generated by a video camera.

31. The computer program product of claim 30, wherein the at least one video stream is cached at a location selected from the group consisting of the terminal from which the video stream originated, the first terminal, a satellite broadcast center, and a cable head-end.

32. The computer program product of claim 30, the method further comprising:

detecting a user selection of one of the video streams being displayed;

retrieving a cached copy of an earlier-in-time segment of the selected video stream; and displaying the cached copy of the earlier-in-time segment on the first terminal.

33. A computer program product comprising program code for performing a method for establishing two-way video communication between a plurality of terminals connected by a network, the method comprising:

receiving at an intermediate network node a plurality of video streams, each video stream being generated by a video camera associated with a different terminal;

combining the plurality of video streams into a composite video stream;

sending the composite video stream to a first terminal for display thereon, wherein the plurality of video streams within the composite video stream are arranged in a ticker format;

detecting a user selection of one of the plurality of video streams being displayed within the composite video stream; and establishing two-way video communication between the first terminal and the terminal associated with the selected video stream.

34. The computer program product of claim 33, wherein the intermediate network node comprises a cable head-end.

35. The computer program product of claim 33, wherein the intermediate network node comprises a satellite broadcast center.

36. A computer program product comprising program code for performing a method for establishing two-way video communication between a plurality of terminals connected by a network, the method comprising:
  receiving at a first terminal a plurality of video streams, each video stream being associated with a different terminal;
  simultaneously displaying the plurality of video streams on the first terminal, wherein the plurality of video streams are arranged in a ticker format;
  detecting a user selection of one of the video streams being displayed;
  establishing a two-way video communication channel between the first terminal and a second terminal associated with the selected video stream;
  displaying a video communication window on the first terminal;
  capturing a first video stream using a video camera associated with the first terminal;
  transmitting the first video stream to the second terminal for display thereon;
  receiving a second video stream from the second terminal; and
  displaying the second video stream in the video communication window on the first terminal.

37. The computer program product of claim 36, wherein at least one video stream comprises a live video stream generated by a webcam.

38. A computer program product comprising program code for performing a method for establishing two-way video communication between a plurality of interactive television systems connected by a network, the method comprising:
  receiving at a first interactive television system a plurality of video streams, each video stream being generated by webcam associated with a different interactive television system;
  simultaneously displaying the plurality of video streams on the first interactive television system, wherein the plurality of video streams are arranged in a ticker format;
  detecting a user selection of one of the video streams being displayed; and
  establishing two-way video communication between the first interactive television system and the interactive televisions system associated with the selected video stream.

39. A system for establishing two-way video communication between a plurality of terminals connected by a network, the system comprising:
  a stream reception component configured to receive at a first terminal a plurality of video streams, each video stream being generated by a video camera associated with a different terminal;
  a stream display component configured to simultaneously display the plurality of video streams on the first terminal, wherein the plurality of video streams are arranged in a ticker format;
  a stream selection component configured to detect a user selection of one of the video streams being displayed; and
  a video communication component configured to establish two-way video communication between the first terminal and the terminal associated with the selected video stream.

40. The system of claim 39, wherein at least one video stream comprises a live video stream generated by a webcam.

41. The system of claim 39, wherein at least one video stream comprises a pre-recorded video stream in response to the video camera associated with the selected video stream being currently inactive.

42. The system of claim 39, wherein the stream display component is further configured to arrange the plurality of video streams in a grid format on the first terminal.

43. The system of claim 39, wherein the stream display component is further configured to move the video streams in a same direction across at least a portion of a display screen of the first terminal.

44. The system of claim 39, wherein at least one terminal comprises an interactive television system.

45. The system of claim 39, wherein the stream reception component is further configured to selectively receive video streams corresponding to entries in a video phonebook.

46. The system of claim 39, wherein the stream selection component is further configured to move a selection outline around a displayed video stream in response to user activation of navigational buttons on a remote control device and
  detect user activation of a specifically-designated button on the remote control device for establishing two-way video communication.

47. The system of claim 39, wherein the video communication component is further configured to display a video communication window on the first terminal; capture a first video stream using a video camera associated with the first terminal; transmit the first video stream to the second terminal for display thereon; receive a second video stream from the second terminal; and display the second video stream in the video communication window on the first terminal.

48. The system of claim 47, wherein the video communication component is further configured to enlarge the selected video stream as displayed on the first terminal relative to the non-selected video streams, wherein the enlarged video stream comprises the video communication window.

49. The system of claim 39, further comprising:
  a stream caching component configured to cache at least one video stream generated by a video camera.

50. The system of claim 49, wherein the at least one video stream is cached at a location selected from the group consisting of the terminal from which the video stream originated, the first terminal, a satellite broadcast center, and a cable head-end.

51. The system of claim 49, wherein the stream selection component is further configured to detect another user selection of one of the video streams being displayed; wherein the stream caching component is further configured to retrieve a cached copy of an earlier-in-time segment of the selected video stream; and wherein the stream display component is further configured to display the cached copy of the earlier-in-time segment on the first terminal.

52. A system for establishing two-way video communication between a plurality of terminals connected by a network, the system comprising:
  a stream reception component configured to receive at an intermediate network node a plurality of video streams, each video stream being generated by a video camera associated with a different terminal;
  a stream compositing component configured to combining the plurality of video streams into a composite video stream, wherein the plurality of video streams within the composite video stream are arranged in a ticker format;

a stream transmission component configured to send the composite video stream to a first terminal for display thereon;

a stream selection component configured to detect a user selection of one of the plurality of video streams being displayed within the composite video stream; and a video communication component configured to establish two-way video communication between the first terminal and the terminal associated with the selected video stream.

53. The system of claim 52, wherein the intermediate network node comprises a cable head-end.

54. The system of claim 52, wherein the intermediate network node comprises a satellite broadcast center.

55. A system for establishing two-way video communication between a plurality of terminals connected by a network, the system comprising:

a stream reception component configured to receive at a first terminal a plurality of video streams, each video stream being associated with a different terminal;

a stream display component configured to simultaneously display the plurality of video streams on the first terminal, wherein the plurality of video streams are arranged in a ticker format;

a stream selection component configured to detect a user selection of one of the video streams being displayed;

a video communication component configured to establish a two-way video communication channel between the first terminal and a second terminal associated with the selected video stream; display a video communication window on the first terminal; capture a first video stream using a video camera associated with the first terminal; transmit the first video stream to the second terminal for display thereon; receive a second video stream from the second terminal; and display the second video stream in the video communication window on the first terminal.

56. The system of claim 55, wherein at least one video stream comprises a live video stream generated by a webcam.

57. A system for establishing two-way video communication between a plurality of interactive television systems connected by a network, the system comprising:

a stream reception component configured to receive at a first interactive television system a plurality of video streams, each video stream being generated by webcam associated with a different interactive television system;

a stream display component configured to simultaneously display the plurality of video streams on the first interactive television system, wherein the plurality of video streams are arranged in a ticker format;

a stream selection component configured to detect a user selection of one of the video streams being displayed; and a video communication component configured to establish two-way video communication between the first interactive television system and the interactive televisions system associated with the selected video stream.

* * * * *

UNITED STATES PATENT AND TRADEMARK OFFICE
CERTIFICATE OF CORRECTION

| | |
|---|---|
| PATENT NO. | : 7,003,795 B2 |
| APPLICATION NO. | : 09/892160 |
| DATED | : February 21, 2006 |
| INVENTOR(S) | : Paul G. Allen |

It is certified that error appears in the above-identified patent and that said Letters Patent is hereby corrected as shown below:

Column 1, line 42, ". . . Similarly, a child caring. . ." change to --Similarly, grown children caring--

Column 2, line 29, ". . . of an system for . . ." change to --of a system for--

Column 3, line 63, ". . . embodied as digital video camera . . ." change to --embodied as a digital video camera--

Column 5, line 34, ". . . and an "Cache" button . . ." change to --and a "Cache" button--

Column 5, line 66, ". . . tape handling systems, . . ." change to --tape handling system--

Column 6, line 10, ". . . components a set top . . ." change to --components of a set--

Column 8, lines 47-48, ". . . is not transmitted live . . ." change to --is not transmitting live--

Column 9, lines 1-2, ". . . networks, such as such as broadband . . ." change to --networks, such as broadband--

Column 9, line 33, ". . . display 406 component." change to --display component 406.--

Column 10, line 22, ". . . single row or column are within . . ." change to --single row or column is within--

Column 10, line 41, ". . . means of with the stream . . ." change to --means of the stream--

Column 13, lines 14-15, ". . . generated by webcam associated . . ." change to --generated by a webcam associated--

Column 13, line 26, ". . . televisions system associated . . ." change to --television system associated--

Column 15, lines 33-34, ". . . generated by webcam associated . . ." changed to --generated by a webcam associated--

UNITED STATES PATENT AND TRADEMARK OFFICE
CERTIFICATE OF CORRECTION

PATENT NO. : 7,003,795 B2
APPLICATION NO. : 09/892160
DATED : February 21, 2006
INVENTOR(S) : Paul G. Allen It is certified that error appears in the above-identified patent and that said Letters Patent is hereby corrected as shown below:

Column 15, line 45, ". . . televisions system associated . . ." change to --television system associated--

Column 16, lines 63-64, ". . . configured to combining the plurality . . ." change to --configured to combine the plurality--

Column 18, line 16, ". . . generated by webcam associated . . ." change to --generated by a webcam associated--

Column 18, lines 28-29, ". . . and the interactive televisions system associated . . ." change to --and the interactive television system associated--

Signed and Sealed this

Thirtieth Day of January, 2007

JON W. DUDAS
*Director of the United States Patent and Trademark Office*